Patented May 13, 1930

1,758,146

UNITED STATES PATENT OFFICE

WALTER M. CROSS, OF KANSAS CITY, MISSOURI, ASSIGNOR TO CROSS COAL-O-MATIC COMPANY, OF KANSAS CITY, MISSOURI, A CORPORATION OF MISSOURI

DOMESTIC HEATING SYSTEM

Application filed November 11, 1926. Serial No. 147,667.

This invention relates to improvements in domestic heating systems, and refers more particularly to a hot air system of heating in which the combustion gases passing to the flue are reduced in temperature in their passage through a heat exchanging device below the kindling temperature of wood.

Among the particular objects of the invention are to provide a system having a furnace into which is mechanically and automatically fed a comminuted fuel, such as disintegrated coal, the fuel being underfed into the combustion pot, and overflowing onto an inclined grate, the grate terminating in automatic intermittently operated dumping device, whereby the ashes are removed from the grate and dumped directly into an ashpit; to provide a system which is automatically controlled by a dual system of control, one phase of the system operating the fuel feed and a force draft mechanism by variations in the room temperature of the dwelling, the other control functioning the fuel feed and force draft by predetermined minimum temperatures in the furnace or combustion pot, and in general to provide a system hereinafter described in more detail and incorporating a number of well known advantages of the modern type of heating system.

Figure 1:
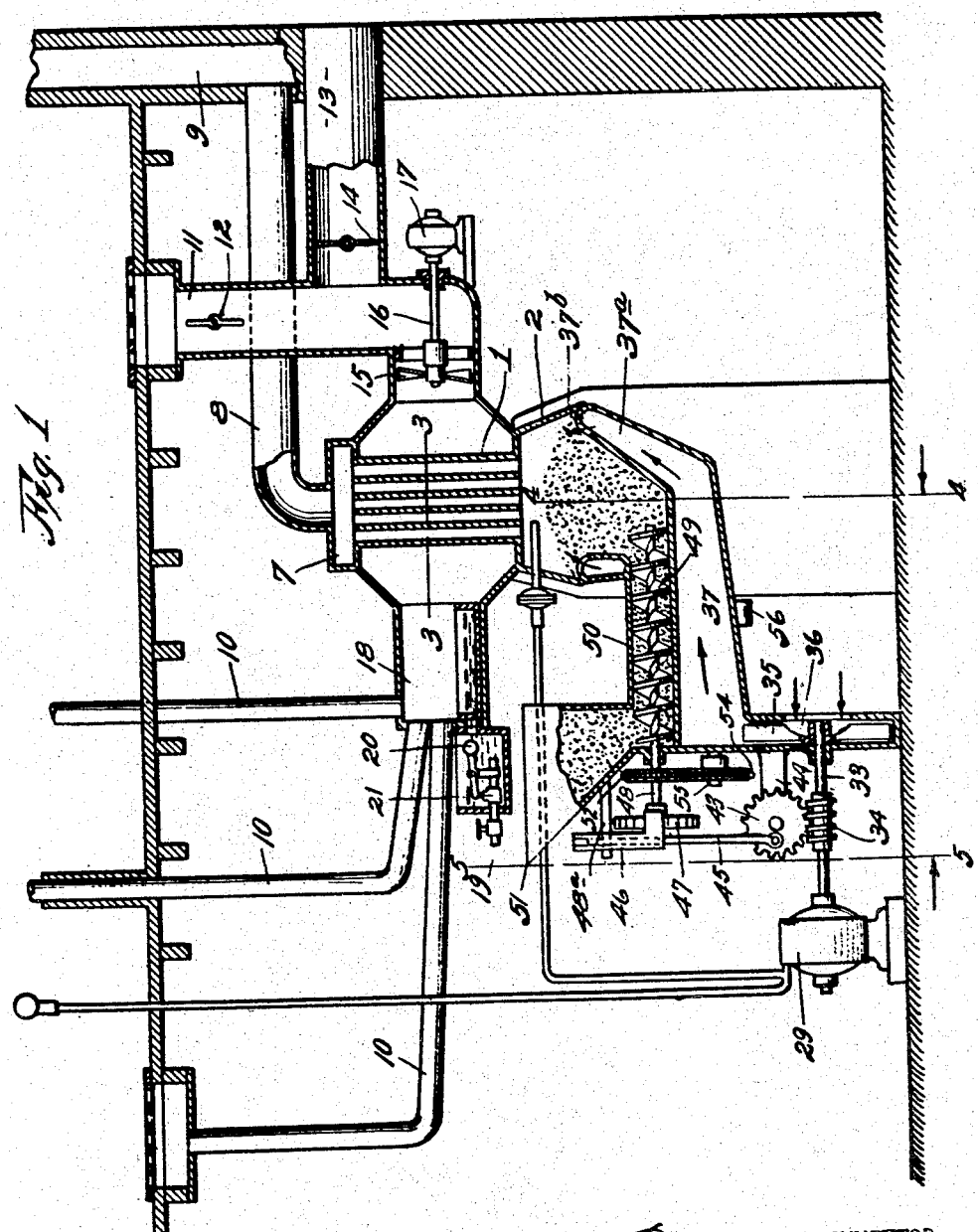
Fig. 1 is a diagrammatic side elevational view of a portion of the system, the furnace mechanism and its controls being shown in section, while the distributing pipes have been partially or totally eliminated for simplicity.

Referring to the drawings, at 1 is shown a heat exchanging device above a furnace comprising a combustion pot 2 and an inclined grate 3.

Figure 3:
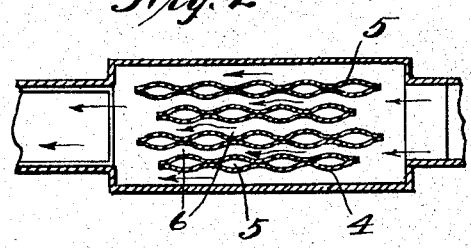
Fig. 3 is a sectional view taken along the line 3—3 in Fig. 1, looking in the direction of the arrow.

The heat exchanger consists in a plurality of corrugated sheets welded, or otherwise fastened together in pairs to produce a construction shown best in cross section in Fig. 3; these pairs of sheets are designated by the numeral 4 in Fig. 3, the tubular passageways produced by the pairing of the corrugated sheets are designated as 5, while the sinuous annular spaces between the elements 4 are designated as 6. The gases of combustion produced by the burning of fuel pass through the tubular passageways 5 and out through a top header 7 to the flue 8, and thence into the chimney 9.

The air which is heated and distributed through the pipe leads or distributing pipes 10 is supplied either through the return duct 11 controlled by a damper 12 or through an outside air inlet duct 13 regulated by a damper 14. A fan 15 mounted upon a shaft 16 and supported within the duct 11 is driven by a motor 17, the shaft of the motor carrying the fan being supported in suitable bearings in the duct. The purpose of the fan is to produce a positive circulation of the air through the system. This air, which is driven by the fan, is directed through an annular passageways 6 where it is heated, due to the fact that it brought in radiating contact with the highly heated outer surfaces of the tubular passageways 5 through which the combustion gases pass. On discharge from the heat exchanger the heated air passes through a humidifying chamber 18, in which is maintained a pool of water by a supply pipe 19, automatically controlled by a liquid level float 20, and valve 21, the control maintaining a constant water level in the humidifying chamber. After being humidified the heated air is directed through the respective distributing pipes or ducts 10, to the separate rooms of the dwelling, not shown in the drawings.

Figure 2:
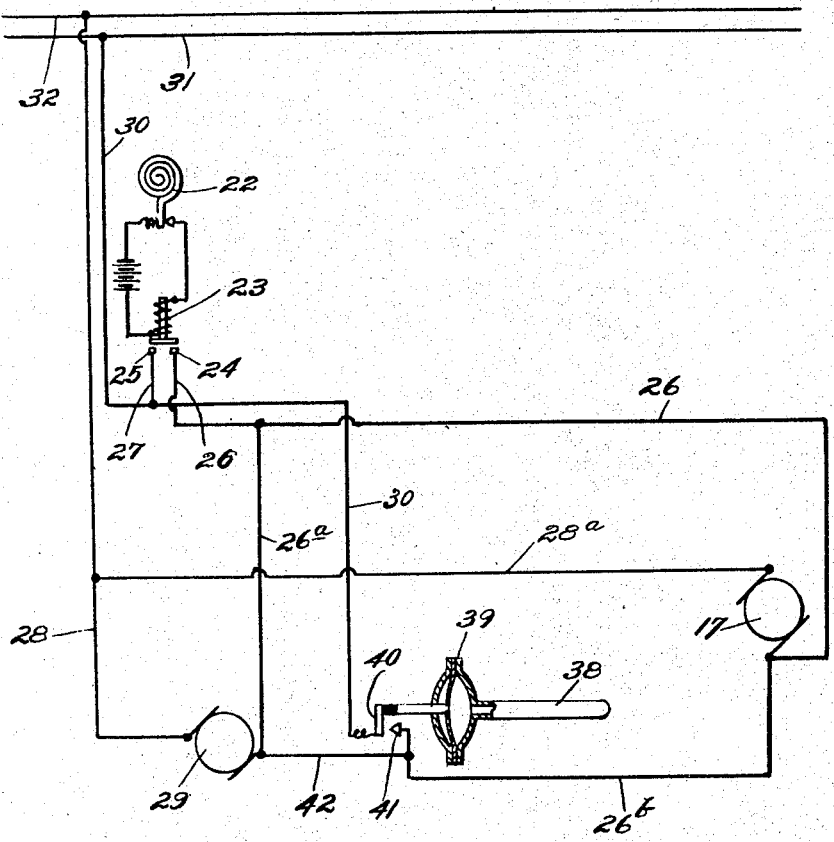
Fig. 2 is a detail view of the electrical control system.

Referring now to the control which is detailed in Fig. 2. At 22 is a thermostat which controls the operation of the switch 23. 24 and 25 are contact points which are terminals of the lines 26 and 27 respectively. When the temperature in the dwelling drops below the point at which the thermostat is set, the switch 23 is functioned, at which time the circuit is completed through the lines 26, 28ª and 28, and 26, 26ª and 28, starting the motors 17 and 29. The line 27 is connected by a line 30 to the power line 31, while the line 28 into which is connected the line 28ª has connection with the power line 32. When the circuit is closed and the motor 29 started the shaft 33, carrying the worm 34 and fan 35 is rotated, the fan drawing the air through an inlet duct 36 and discharging it through the ducts 37 into the open channels 37ª formed around the combustion pot 2, similar to an air jacket. The air is discharged from this jacket, or chamber, surrounding the combustion pot, through tuyères or openings 37ᵇ in the inner sides of the combustion pot near the surface of the burning fuel, or at a point substantially where the combustion takes place. To prevent the fire from being entirely extinguished during the periods when the system is shut off for any considerable length of time, a thermo-couple 38, shown in Figs. 1 and 2, is positioned in the combustion space of the furnace, just above the fire zone, and this thermo-couple is set at a predetermined temperature which temperature is regulated to operate the fuel feed and force drafts sufficiently to prevent total extinguishment of the fire. The variations in temperature acting upon the thermo-couple function a diaphragm valve 29 to bring a contacting surface 40 in engagement with the contact point 41 when the temperature in the furnace is reduced to a predetermined point. With the contacting of the elements 40 and 41, the electrical circuit is closed through the lines 30, 42 and 28, and 30, 26ᵇ, 28ª, and 28 to start the motors 17 and 29 as they were started by the thermostat. The fire is continued until the furnace temperature is raised sufficiently high to break the contact between 40 and 41, shutting off the motors 17 and 29, which drive the fuel feed and force draft and the air circulation through the system.

Figure 4:
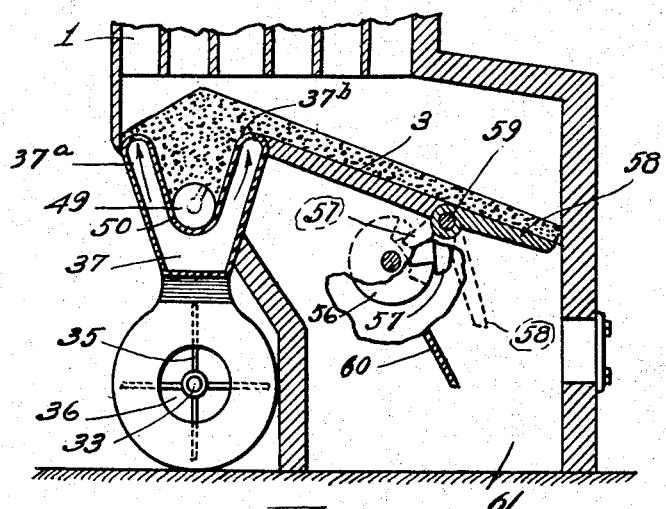
Fig. 4 is a view taken along the line 4—4 in Fig. 1, looking in the direction of the arrow.
Figure 5:
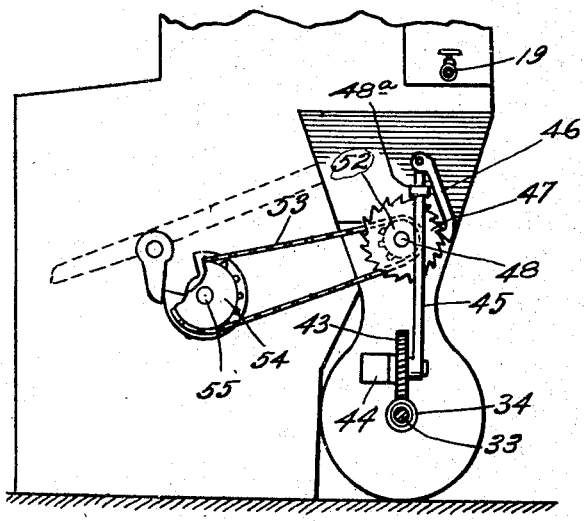
Fig. 5 is a view taken along the line 5—5 in Fig. 1, looking in the direction of the arrow.
Figure 6:
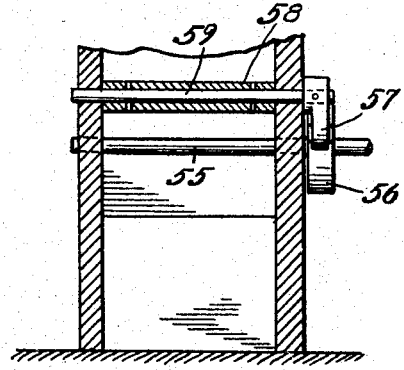
Fig. 6 is a fragmentary detail of a portion of the drive mechanism.

Referring now to the drive for the fuel feed mechanism, the worm 34 meshes with a worm wheel 43, the latter being supported by a hanger 44. The lower end of the crank 45 is connected to the face of the worm wheel and is given a reciprocating movement, due to its offset position from the center of the wheel. This reciprocating movement is transferred to a dog 46, which engages the teeth of a ratchet wheel 47, the latter being mounted upon a shaft 48. The vertical reciprocating crank 45 slides in an upper guide member 48ª which prevents also displacement of the dog from the ratchet. Upon the shaft 48 is also mounted a conveyor screw, 49 operating in a pipe 50 which serves as a conveying duct between the hopper 51 and the combustion pot 2. The rotation of the conveyor screw transfers the fuel from the hopper to the combustion pot where it is underfed to the combustion pot. A sprocket wheel 52 is also mounted upon the shaft 48, and drives the chain 53 which runs over a sprocket 54 mounted upon a shaft 55. This shaft 55 also carries a cam wheel 56 which has a portion of its outer surfaces cut away. The outer surface of the cam 56 rides against a depending tongue 57 of the dump grate 58, which is positioned at the end of the inclined grate 33. Through a considerable part of the rotation of the cam the dump grate is held in the full line position shown in Fig. 4, but when the cut out portion is rotated so that the depending tongue can swing into a position shown in the dotted line position in Fig. 4, the grate being pivoted at 59 drops down, permitting the ashes or spent fuel gravitating along the inclined grate 3 to drop into the hopper 60 and thence into the ash-pit 61 below the furnace.

It is recognized to be common practice to circulate air through a furnace by means of a blower fan, and also to humidify this air prior to its distribution. It is recognized as common practice also to automatically stoke a furnace by means of a conveyor screw but to supply the fuel by an under feed device, and to inject the air substantially at the combustion point in the furnace and to allow the overflowing burning fuel from the combustion pot to gravitate downwardly over an inclined grate and at the end of this grate to automatically and intermittently dump the ashes into a pit, is thought to be a practice which is novel in the art.

Further more the dual electrical control apparatus—one control regulated by the variations in room temperature in the dwelling and a separate control operating simultaneously therewith functioned by a predetermined minimum temperature in the combustion zone of the furnace, constitutes another feature of the invention.

The fuel which is used is consumed always under the most economical conditions, as the system is either turned on full or entirely off, so that the most efficient operating conditions exist for combustion, or the system is what may be termed as in a smoldering or banked condition. There is no regulation of drafts as in the common type of hot air furnace, making for operation under varying conditions, none of which are perhaps economically proper and efficient for the fuel which is being used.

By this invention then, economical conditions of combustion are at all times enforced, for when the thermostat in the heated room reaches a predetermined temperature, there is a complete stoppage of the fuel feed mechanism and the forced draft fan. This permits then only the burning of the residual fuel which when consumed would allow the fire to be entirely extinguished if it were not for the auxiliary control within the combustion pot, which functions when the furnace is cooled to say 200° F. This auxiliary control starting the fuel feed and force draft again institutes maximum operation until the temperature in the combustion pot is restored to 200° F., or at any other predetermined temperature selected for the minimum temperature of the furnace.

It may, under certain conditions, be desirable to have the auxiliary control or the control functioned by the furnace temperature connected only to the fuel feed and force draft, so that the air circulation or the operation of the fan 17 is dispensed with when the system is being operated to maintain the minimum furnace temperature.

In the construction of the heat exchanger 1, the relation of heating surface to fuel burned is at least that of 200 square foot surface per 1000 B. t. u. produced per minute. When this relation is used the stacked temperature is approximately 150° F. (a temperature well below the kindling temperature of soot or wood).

This mechanism then for the first time supplies a system in which under maximum operating conditions the stack temperatures are still below a temperature sufficiently high to burn or ignite wood or soot, and will at all times range below 250° F.

It is a well known fact that a large portion of the fires in domestic dwellings are occasioned by overheating of chimneys or flues connecting with the chimneys; a condition occasioned by high stack temperatures. By the use of the present invention these excessive stack temperatures would be impossible, as it would be impossible to operate the system so that the stack temperatures would rise above the kindling temperature of wood, as previously stated—this being due to the efficient heat exchange taken place between the combustion gases and circulating air. The relation then of the maximum combustion measured in B. t. u. units to the heating exchanging surface is such that the products of combustion are pooled to a temperature below the kindling temperature of wood or soot.

The system in combination with automatic stoker regulated simultaneously by a dual or double thermostatic control, which prevents the extinguishment of the fire and maintains a proper room temperature, comprises briefly the features of the system.

The furnace construction relies for its novelty upon underfeeding of a granulated or disintegrated fuel to a combustion pot and supplying air at substantially the combustion point; also, in the distributing of this overflowing burning fuel onto an inclined grate and automatically and intermittently dumping the ashes to a pit provided for that purpose.

I claim as my invention:

1. A heating system comprising a combustion pot, means for feeding fuel thereto, a combustion space above the combustion pot, means controlled by the temperature of the rooms to be heated for automatically regulating the fuel feeding means, and a separate thermostatic control actuated by predetermined minimum temperatures in said combustion space for preventing extinguishment of the fire when operating under low heat requirement conditions.

2. A heating system comprising a combustion pot, means for feeding fuel thereto, a combustion space above the combustion pot, means controlled by the temperature of the rooms to be heated for turning on and off the feeding means, and a separate thermostatic control actuated by a predetermined minimum temperature in said combustion space for preventing extinguishment of the fire when operating under low heat requirement conditions.

3. A heating system of the character described comprising a combustion pot, means for feeding fuel thereto, means for forcing air to said combustion pot, means controlled by the temperature of the rooms to be heated for automatically turning on and off the fuel feeding means and the air forcing means, a combustion space heated by said combustion pot and a separate thermostatic control actuated by a predetermined minimum temperature in the combustion space for preventing extinguishment of the fire when operating under low heat requirement conditions.

4. A domestic heating plant of the character described comprising a combustion pot, an automatic stoker adapted to supply fuel thereto, means controlled by the temperature of the rooms to be heated for turning on and off the stoker, and a separate thermostatic control actuated by the predetermined minimum temperature of the combustion space for preventing extinguishment of the fire when operating under low heat requirement conditions.

5. A force draft furnace for a heating system having a power driven underfeed stoking element, a dual thermostatic control mechanism connected to the stoker driving means, one thermostat mechanism functioning by variations of the temperature in the space to be heated, and the other by predetermined minimum temperature within the furnace to prevent extinguishment of the fire.

WALTER M. CROSS.